United States Patent Office 2,872,453
Patented Feb. 3, 1959

2,872,453
INDOLE DERIVATIVES

Robert Michel Jacob, Ablon-sur-Seine, and Jean Clement Louis Fouche, Paris, France, assignors to Societe des Usines Chimiques Rhone-Poulenc, Paris, France, a French body corporate No Drawing. Application December 13, 1956
Serial No. 628,002

Claims priority, application France December 16, 1955

6 Claims. (Cl. 260—293)

This invention is for improvements in or relating to indole derivatives and has for its object to provide new indole derivatives having useful therapeutic properties.

The new indole derivatives of the present invention consist of the compounds of the following general Formula I and their addition salts:

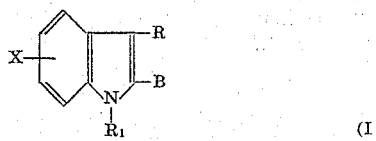
(I)

wherein R and $R_1$ are the same or are different and represent hydrogen atoms or lower alkyl or aralkyl groups, X is a hydrogen or halogen atom or a lower alkyl or alkoxy group and B is a piperidyl, N-alkylpiperidyl, N-aralkylpiperidyl or N-alkyl-1:2:5:6-tetrahydropyridyl group attached to the indole nucleus at the 2- or 4-position of the piperidine or tetrahydropyridine nucleus, which latter nuclei may be substituted by a lower alkyl group.

The qualification "lower" as used in this specification and in the appended claims means that the group to which it is applied (alkyl or alkoxy) contains not more than 6 and preferably not more than 4 carbon atoms.

According to a feature of this invention, the aforesaid new indole derivatives are prepared by the reduction of compounds of the general Formula II:

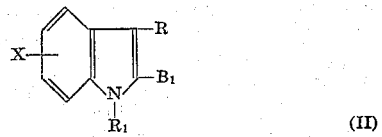
(II)

wherein X, R and $R_1$ are as hereinbefore defined and $B_1$ represents the grouping III:

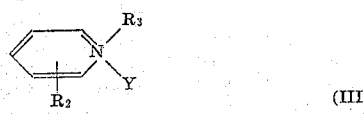
(III)

attached at its 2- or 4-position to the indole nucleus and wherein $R_2$ represents a hydrogen atom or a lower alkyl group, $R_3$ represents a hydrogen atom, a lower alkyl group or an aralkyl group and Y represents an anion such as a halogen atom.

When it is desired to obtain compounds for which B, in general Formula I is a piperidyl, N-alkylpiperidyl, or N-aralkylpiperidyl group, reduction is preferably carried out by catalytic hydrogenation in the presence of Adams' platinum as catalyst in an alcoholic or aqueous alcoholic medium at ordinary temperatures and pressures. When the compounds are those for which B is an N-alkyl-1:2:5:6-tetrahydropyridyl group there is used controlled reduction of the corresponding pyridine derivatives of Formula II, particularly the reduction of the latter by means of an alkali metal borohydride.

Where the bases of Formula I are not prepared, by the aforesaid process, in the form of salts and isolated for use as such, they may, if desired, be converted into such salts by conventional methods.

The new compounds of the invention are particularly active anti-convulsants and medullary depressants. The latter property may be demonstrated, in particular, in terms of antagonistic action against strychnine (cf. for example F. M. Berger, Pharmaceut. Reviews 1, 274 (1949)). They are also active in sufficiently high doses as potentiators of narcosis. They may be used as non-hypnotic sedatives, in particular in anxiety states and nervous tension. They may also have a favourable effect in the treatment of hypertension, directly on account of their sedative properties. Finally these products have some degree of anti-helmintic activity.

The bases of Formula I may be used as such or in the form of addition salts containing pharmaceutically-acceptable anions. Such addition salts which include acid addition salts (e. g. hydrochloride, phosphate, nitrate, sulphate, maleate, fumarate, citrate, tartrate, methanesulphonate or ethanedisulphonate) and quaternary ammonium salts (e. g. methiodide, methochloride and methobromide or the corresponding ethyl analogues) are particularly satisfactory therapeutically-acceptable forms for facilitating administration of the corresponding bases. Reference herein to salts of the bases of Formula I is to be understood as having this particular and limited significance. Individual such bases which, together with their salts, are of outstanding importance are:

2-(1-methyl-2-piperidyl)-3-ethylindole, 2 - (1 - ethyl - 2-piperidyl)-3-ethylindole, 2-(1 - methyl - 2 - piperidyl) - 3-propylindole, 2-(1-methyl - 4 - piperidyl) - 3 - ethylindole, 2-(1-methyl-1:2:5:6-tetrahydro-2-pyridyl)-3 - ethylindole, 2-(1-methyl-2-piperidyl)indole, 2-(1-methyl-2-piperidyl)-3-methylindole, 2-(1-ethyl-2-piperidyl) - 3 - methylindole, 2-(1-methyl-2-piperidyl)-3-ethyl-6 - chloroindole, 2 - (1:4-dimethyl-2-piperidyl)-3-ethylindole and 2 - (1 - methyl-2-piperidyl)-3-ethyl-6-methoxyindole.

The invention is illustrated by the following examples; the melting points, unless otherwise indicated, were determined on the Kofler bench.

*Example I*

2 - (2 - pyridyl) - 3 - ethylindole methobromide (33 g.), M. P. 215° C. [prepared by the action of methyl bromide in acetone solution upon 2-(2-pyridyl)-3-ethylindole, M. P. 105° C.] is dissolved in a mixture (250 cc.) of ethanol and water (75:25 by volume). This solution is hydrogenated at ordinary temperature and pressure in the presence of Adams' platinum (2.2 g.) until the solution becomes colourless. The catalyst is filtered off and the solution is evaporated to dryness. The residue is taken up at 80° C. in water (250 cc.) and aqueous sodium hydroxide (d.=1.33, 10.4 cc.). After cooling, the aqueous solution is extracted with ether (200 cc. followed by 100 cc.), the ethereal solution is extracted with 2 N acetic acid (200 cc.) and the acetic acid solution is made alkaline with aqueous sodium hydroxide (d.=1.33, 35 cc.). The base liberated is extracted with ether (2×100 cc.), the ethereal solution is dried over potassium carbonate and is then heated on the water bath to remove the ether. There is obtained 2-(1-methyl-2-piperidyl)-3-ethylindole (21 g.) which is purified through the hydrochloride which melts at 213–215° C. (Maquenne block).

*Example II*

2-(2-pyriydl)-3-ethylindole bromobenzylate (1.9 g.), M. P., 179° C. [prepared by the action of benzyl bromide in acetone solution on 2-(2-pyridyl)-3-ethylindole], is dissolved in anhydrous ethanol (300 cc.). The solution obtained is hydrogenated at ordinary temperature and pressure in the presence of Adam's platinum (1 g.) until the solution becomes colourless.

The colourless solution is made alkaline with 2 N sodium hydroxide (20 cc.), freed from platinum by filtration and then evaporated to dryness under a partial vacuum. The residue is treated with distilled water (100 cc.) and ether (100 cc.). After decanting, the aqueous solution is again extracted with ether (100 cc.). The combined ethereal solutions are dried over potassium carbonate and then heated on the water bath to remove the solvent. There is thus obtained a 2-(1-benzyl-2-piperidyl)-3-ethylindole (1.3 g.) as an oil. It is purified through the hydrochloride which melts at 245–250° C. (Maquenne). The picrate melts at 225–230° C.

*Example III*

2-(2-pyridyl)-3-methylindole methobromide (3.03 g.), M. P. 248–250° C. [prepared by the action of methyl bromide in acetone solution upon 2-(2-pyridyl)-3-methylindole, M. P. 103–104° C.], is dissolved in a mixture (50 cc.) of ethanol and water (75:25 by volume). This solution is hydrogenated at ordinary temperature and pressure in the presence of Adam's platinum (0.2 g.) until it becomes colourless. It is then filtered, made alkaline with 2 N sodium hydroxide solution (10 cc.) and taken to dryness. The residue is treated with water (50 cc.) and ether (50 cc.). The solutions are decanted and the aqueous solution is washed with ether (2×50 cc.). The ethereal solutions are dried over potassium carbonate and then heated on the water bath to remove the ether. There is thus obtained 2-(1-methyl-2-piperidyl)-3-methylindole (2 g.) as an oil which is purified through the hydrochloride which melts at 142–144° C. (Maquenne).

*Example IV*

2-(4-pyridyl)-3-ethylindole methobromide (7.3 g.), M. P. 315–320° C. (Maquenne), is dissolved in 90% by volume methanol (450 cc.). This solution is hydrogenated at ordinary temperature and pressure in the presence of Adam's platinum (1 g.). After the absorption of 3 mols. of hydrogen the solution becomes colourless and the reaction stops.

The catalyst is filtered off and the solution is made alkaline with 2 N sodium hydroxide (12 cc.). The solvents are removed in vacuo and the residue is treated with distilled water (200 cc.) and ether (200 cc.). The solutions are decanted and the aqueous layer is washed with ether (2×100 cc.). The ethereal solutions are combined and dried over potassium carbonate.

The ether is removed on the water bath and there is obtained a white crystalline residue (5.4 g.), M. P. 137° C., which is purified by recrystallisation from heptane. The purified product which melts at 138° C. is 2-(1-methyl-4-piperidyl)-3-ethylindole.

The initial methobromide is obtained by the action of methyl bromide in acetone solution at a temperature of 60° C. upon 2-(4-pyridyl)-3-ethylindole, M. P. 151° C., which may itself be obtained by the Fischer reaction of 4-butyrylpyridine phenylhydrazone, M. P. 128° C.

*Example V*

Proceeding as in Example IV but commencing with 2-(2-pyridyl)-3-methylindole ethobromide (3 g.), M. P. 200–203° C., there is obtained 2-(1-ethyl-2-piperidyl)-3-methylindole (2.3 g.), the hydrochloride of which melts at about 235–240° C. (Maquenne).

*Example VI*

Proceeding as in Example IV but commencing with 2-(2-pyridyl)-3-ethylindole ethobromide (6 g.), M. P. 196° C., there is obtained 2-(1-ethyl-2-piperidyl)-3-ethylindole (3 g.), the hydrochloride of which melts at about 207–212° C. (Maquenne).

*Example VII*

Proceeding as in Example IV but commencing with 2-(2-pyridyl)-3-propylindole methobromide (4.6 g.), M. P. 154–155° C., there is obtained 2-(1-methyl-2-piperidyl)-3-propylindole (3.3 g.), the hydrochloride of which melts at about 170–171° C.

The initial methobromide is obtained, proceeding as in Example IV, from 2-(2-pyridyl)-3-propylindole, M. P. 127° C., itself obtained from 2-valerylpyridine phenylhydrazone, M. P. 105–106° C. This ketone is obtained by reaction of butylmagnesium bromide on 2-cyanopyridine (B. P. 110–111° C./10 mm. Hg).

*Example VIII*

Proceeding as in Example IV but commencing with 2-(2-pyridyl)-3-isopropylindole methobromide (5.8 g.), M. P. 230° C., there is obtained 2-(1-methyl-2-piperidyl)-3-isopropylindole (4.2 g.), the hydrochloride of which melts at about 253–258° C. (Maquenne).

The initial methobromide is obtained, proceeding as in Example IV, from 2-(2-pyridyl)-3-isopropylindole, M. P. 128° C., itself obtained from 2-isovalerylpyridine phenylhydrazone, M. P. 60° C. This ketone is obtained by reaction of isobutylmagnesium bromide on 2-cyanopyridine (B. P. 111–112.5° C./15 mm. Hg).

*Example IX*

2-(2-pyridyl)-3-ethyl-5-hydroxyindole methobromide (12.2 g.), M. P. 260° C. (Maquenne), is dissolved in 75% by volume ethanol (400 cc.). This solution is hydrogenated at ordinary temperature and pressure in the presence of Adam's platinum (1.2 g.). After the absorption of 3 mols. of hydrogen the solution becomes colourless and the reaction ceases.

The catalyst is filtered off and N sodium hydroxide solution (36.7 cc.) is added. The solvents are removed in vacuo. The residue is treated with water (100 cc.) and ether (150 cc.), the solutions are decanted and the aqueous layer is washed with ether (100 cc.). The combined ethereal solutions are dried over potassium carbonate and the ether is removed on the water bath and then in vacuo. There is obtained a pale red-brown solid residue (10 g.), M. P. 115–117° C., the hydrochloride of which melts at 155° C. The product obtained is 2-(1-methyl-2-piperidyl)-3-ethyl-5-hydroxyindole.

The initial methobromide is obtained by the action of methyl bromide in acetone solution at a temperature of 60° C. upon 2-(2-pyridyl)-3-ethyl-5-hydroxyindole, M. P. 170° C., which may itself be obtained by the Fischer reaction on 2-butyrylpyridine 4-benzyloxyphenylhydrazone, M. P. 96–97° C.

*Example X*

Proceeding as in Example IX but commencing with 1-methyl-2-(2-pyridyl)-3-ethylindole methobromide (5.86 g.), there is obtained 1-methyl-2-(1-methyl-2-piperidyl)-3-ethylindole (3.5 g.) whose picrate melts at 205–207° C. (Maquenne). The initial methobromide is obtained by the action of methyl bromide in acetone solution at a temperature of 60° C. upon 1-methyl-2-(2-pyridyl)-3-ethylindole, M. P. 67–68° C., obtained by the action of methyl iodide upon the sodium derivative of 2-(2-pyridyl)-3-ethylindole in liquid ammonia. 2-(2-pyridyl)-3-ethylindole, M. P. 104° C., is itself prepared by the Fischer reaction upon 2-butyrylpyridine phenylhydrazone, M. P. 90° C.

*Example XI*

Proceeding as in Example IX but commencing with 2-(2-pyridyl)-3-ethyl-5-methoxyindole methobromide (13.9 g.), M. P. 201° C., there is obtained 2-(1-methyl-2-piperidyl)-3-ethyl-5-methoxyindole (9.1 g.), whose hydrochloride melts at 223–225° C. (Maquenne).

The initial methobromide is obtained by the action of methyl bromide in acetone solution at a temperature of 60° C. upon 2-(2-pyridyl)-3-ethyl-5-methoxyindole, M. P. 116° C., which may itself be obtained by the Fischer reaction upon 2-butyrylpyridine 4-methoxyphenylhydrazone, M. P. 102° C.

*Example XII*

Proceeding as in Example IX but commencing with 2-(2-pyridyl)-indole methobromide (5 g.), M. P. 275° C. (Maquenne), there is obtained 2-(1-methyl-2-piperidyl)indole (3.5 g.) whose picrate melts at 244–246° C.

The initial methobromide is obtained by the action of methyl bromide in acetone solution at a temperature of 60° C. upon 2-(2-piperidyl)indole, M. P. 155–157° C., which may itself be obtained by the Fischer reaction upon 2-acetylpyridine phenylhydrazone, M. P. 157° C.

*Example XIII*

Proceeding as described in Example IX but commencing with 2-(2-pyridyl)-3-ethyl-5-chloroindole methobromide (7.5 g.), M. P. 214° C., there is obtained 2-(1-methyl-2-piperidyl)-3-ethyl-5-chloroindole (5.9 g.), whose hydrochloride melts at 248–250° C. (Maquenne).

The initial methobromide is obtained by the action of methyl bromide in acetone solution at a temperature of 60° C. upon 2-(2-pyridyl)-3-ethyl-5-chloroindole, M. P. 144° C., which may itself be obtained by the Fischer reaction upon 2-butyrylpyridine 4-chlorophenylhydrazone, M. P., 131° C.

*Example XIV*

Proceeding as described in Example IX but commencing with 2-(2-pyridyl)-3-ethyl-6-methoxyindole methobromide (22.2 g.), M. P. 232–233° C., there is obtained 2-(1-methyl-2-piperidyl)-3-ethyl-6-methoxyindole (17 g.) which, after purification, melts at 80° C. and whose hydrochloride melts at 195–196° C.

The initial methobromide is obtained by the action of methyl bromide in acetone on 2-(2-pyridyl)-3-ethyl-6-methoxyindole, M. P. 115° C., which may itself be prepared by the Fischer reaction on 2-butyrylpyridine 3-methoxyphenylhydrazone, M. P. 115° C.

*Example XV*

Proceeding as in Example IX but commencing with 2-(2-pyridyl)-3-ethyl-6-chloroindole methobromide (7.5 g.), M. P. 221–222° C., there is obtained 2-(1-methyl-2-piperidyl)-3-ethyl-6-chloroindole (5.9 g.) whose hydrochloride melts first at about 180° C. and then at 242–243° C.

The initial methobromide may be obtained by the action of methyl bromide in acetone upon 2-(2-pyridyl)-3-ethyl-6-chloroindole, M. P. 128° C., itself prepared by the Fischer reaction upon 2-butyrylpyridine 3-chlorophenylhydrazone.

*Example XVI*

Proceeding as described in Example IX but commencing with 2-(4-methyl-2-pyridyl)-3-ethylindole methobromide (15 g.), M. P. 170° C., there is obtained 2-(1:4-dimethyl-2-piperidyl)-3-ethylindole (11.6 g.) whose hydrochloride melts at 228° C.

The initial methobromide is obtained by the action of methyl bromide in acetone solution at a temperature of 60° C. upon 2-(4-methyl-2-pyridyl)-3-ethylindole, M. P. 135° C., which may itself be obtained by the Fischer reaction upon 2-butyryl-4-methylpyridine phenylhydrazone, M. P. 112–113° C.

*Example XVII*

2-(2-pyridyl)-3-ethylindole methobromide (15 g.), M. P. 215° C., is dissolved in a mixture of methanol (200 cc.) and water (50 cc.). A solution of potassium borohydride (4 g.) in a mixture of methanol (100 cc.) and water (50 cc.) is run into the solution obtained with agitation and cooling. After 1 hour's agitation at room temperature the mixture is acidified by the addition of 4% sulphuric acid (25 cc.). Agitation is continued for 1 hour at room temperature and water (200 cc.), followed by aqueous sodium hydroxide (d.=1.33, 20 cc.), is then added. After several successive extractions with ether, the ethereal solutions obtained are dried over anhydrous potassium carbonate. On evaporation of the solvent on the water bath (finally under reduced pressure), there is obtained 2-(1-methyl-1:2:5:6-tetrahydro-2-pyridyl)-3-ethylindole (11.3 g.). The hydrochloride of this product, after recrystallisation from a mixture of methanol and ether, melts at 235–236° C. (Maquenne). The base liberated from this hydrochloride melts at 81° C.

The initial methobromide is obtained by the action of methyl bromide in acetone at 60° C. upon 2-(2-pyridyl)-3-ethylindole, M. P. 105° C.

*Example XVIII*

Proceeding as described in Example XVII but commencing with 2-(4-methyl-2-pyridyl)-3-ethylindole methobromide (10 g.), M. P. 170° C., potassium borohydride (2.5 g.) and corresponding quantities of methanol and water, there is obtained 2-(1:4-dimethyl-1:2:5:6-tetrahydro-2-pyridyl)-3-ethylindole (7.3 g.). The hydrochloride of this product, after recrystallisation from a mixture of methanol and ether, melts at 239–241° C.

The methobromide which is used as starting material is obtained by the action of methyl bromide in acetone at 60° C. upon 2-(4-methyl-2-pyridyl)-3-ethylindole, M. P. 135° C. The latter is prepared by cyclisation by Fischer's method of (4-methyl-2-pyridyl)propyl ketone phenylhydrazone, M. P. 112–113° C. The ketone itself, which boils at 115–116° C./10 mm. Hg, is obtained by the action of methylmagnesium bromide upon 2-cyano-4-methylpyridine.

We claim:

1. As a new composition of matter, a substance selected from the group consisting of the indole derivatives of the formula:

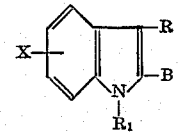

(wherein R and R₁ are each selected from the class consisting of hydrogen atoms and lower alkyl groups, X is selected from the class consisting of hydrogen and chlorine atoms, lower alkyl and lower alkoxy groups, and B is selected from the class consisting of the piperidyl, N-lower-alkylpiperidyl, N-benzylpiperidyl and N-lower-alkyl-1:2:5:6-tetrahydropyridyl groups attached to the indole nucleus at one of the 2- and 4-positions of the B nucleus, and the corresponding piperidyl and tetrahydropyridyl radicals formed by substituting in the nucleus a lower alkyl group) and the salts of the said indole derivatives having pharmaceutically acceptable anions.

2. 2-(1-methyl-2-piperidyl)-3-ethylindole.
3. 2-(1-ethyl-2-piperidyl)-3-ethylindole.
4. 2-(1-methyl-2-piperidyl)-3-propylindole.
5. 2-(1-methyl-2-piperidyl)-3-ethyl-6-chloroindole.
6. 2-(1:4-dimethyl-2-piperidyl)-3-ethylindole.

References Cited in the file of this patent

UNITED STATES PATENTS 2,695,290    Finkelstein _____ Nov. 23, 1954

FOREIGN PATENTS 730,045    Great Britain _____ May 18, 1955